United States Patent
Rausch et al.

(10) Patent No.: US 7,679,545 B2
(45) Date of Patent: Mar. 16, 2010

(54) SUPPRESSING MOTION INTERFERENCE IN A RADAR DETECTION SYSTEM

(75) Inventors: Ekkehart O. Rausch, Atlanta, GA (US); Eugene F. Greneker, III, Marietta, GA (US); John Michael Baden, Kennesaw, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1062 days.

(21) Appl. No.: 10/912,342

(22) Filed: Aug. 5, 2004

(65) Prior Publication Data

US 2006/0028369 A1 Feb. 9, 2006

(51) Int. Cl.
*G01S 13/00* (2006.01)

(52) U.S. Cl. ............ 342/22; 342/159; 342/114; 342/194; 342/192; 342/196

(58) Field of Classification Search ......... 342/159–164, 342/170

See application file for complete search history.

(56) References Cited

U.S. PATENT DOCUMENTS

| | | | | |
|---|---|---|---|---|
| 3,643,257 A * | 2/1972 | Thomson et al. | ............... | 342/92 |
| 4,216,474 A * | 8/1980 | Levine | ............... | 342/201 |
| 4,443,792 A * | 4/1984 | Pidgeon et al. | ............... | 342/124 |
| 4,825,213 A * | 4/1989 | Smrek | ............... | 342/25 B |
| 4,958,638 A | 9/1990 | Sharpe et al. | ............... | 128/653 |
| 6,031,482 A | 2/2000 | Lemaitre et al. | ............... | 342/22 |
| 6,122,537 A | 9/2000 | Schmidt | ............... | 600/407 |
| 6,208,286 B1 | 3/2001 | Rostislavovich et al. | ............... | 342/135 |
| 6,909,397 B1 * | 6/2005 | Greneker, III et al. | ............... | 342/173 |
| 7,199,749 B2 * | 4/2007 | Greneker et al. | ............... | 342/22 |
| 7,460,053 B2 * | 12/2008 | Zemany et al. | ............... | 342/22 |
| 2003/0071750 A1 * | 4/2003 | Benitz | ............... | 342/25 |
| 2003/0135097 A1 * | 7/2003 | Wiederhold et al. | ............... | 600/301 |
| 2005/0128123 A1 * | 6/2005 | Greneker et al. | ............... | 342/22 |
| 2005/0128124 A1 * | 6/2005 | Greneker et al. | ............... | 342/22 |
| 2007/0024487 A1 * | 2/2007 | Zemany et al. | ............... | 342/22 |

OTHER PUBLICATIONS

U.S. Appl. No. 10/732,126, filed Dec. 10, 2003, Greneker, et al.
U.S. Appl. No. 10/735,478, filed Dec. 12, 2003, Greneker, et al.

* cited by examiner

*Primary Examiner*—Thomas H Tarcza
*Assistant Examiner*—Timothy A Brainard
(74) *Attorney, Agent, or Firm*—Thomas, Kayden, Horstemeyer & Risley, LLP

(57) ABSTRACT

One preferred embodiment of the present invention provides a system and method for suppressing motion interference in a radar detection system. Briefly described, in architecture, one embodiment of the system, among others, can be implemented as follows. The system includes a signal generator that transmits microwave signals toward a target area. Also, the system includes a data control system to collect data from reflected microwave signals from the target area and to analyze the data in order to suppress unwanted motion interference generated by movement of the radar detection system. Other systems and methods are also provided.

48 Claims, 11 Drawing Sheets

SUPPRESSING MOTION INTERFERENCE IN A RADAR DETECTION SYSTEM

TECHNICAL FIELD

The present invention is generally related to microwave radar systems and, more particularly, is related to systems and methods for detecting vital signs with a microwave radar system.

BACKGROUND

A "radio detection and ranging" (RADAR or radar) system is often used to detect, range, and map objects. In operation, strong radio waves are transmitted, and then a receiver listens for the reflected echoes and measures their Doppler shifts. There have been many different uses discovered for such radar systems.

One recent use involves the employment of radar techniques to detect minute body movements, which are associated with respiratory activity. This approach is based on the principle that breathing produces measurable phase changes in electromagnetic waves as they reflect off of a living subject. Motion detection is achieved by transmitting an interrogating electromagnetic field at the target of interest, and then measuring the time-delay of the return signal reflected back from the surface of the target. When a target surface is moving, as does the surface of a chest of a living subject in conjunction with respiratory and cardiac activities, corresponding variations will be observed in the measured time-delay. The observed variations can be used to determine motion-related target parameters such as displacement and velocity.

From this line of research and development, a device has been developed called a "radar flashlight." The radar flashlight is designed to detect the respiration of a living subject behind a wall, door or an enclosed space with non-conductive walls. The unit also has application to the location of conscious or unconscious persons in a smoke filled or chemical contaminated office building.

When a radar detection device, such as the radar flashlight, is not stabilized, the user's hand motion is transferred to the wall and other non-moving objects illuminated by the radar. When the radar detection device is in motion, it receives Doppler shifted signals that are generated from its own motion referenced to fixed objects in front of the receiver. This produces radar clutter, which refers to any objects that cause unwanted reflections of a radar's electromagnetic energy to be returned to the radar receiver. The unwanted returns compete with valid returns of interest and cause the radar receiver and radar displays to become cluttered and more difficult to decipher. Depending on the radar cross section of the radar clutter, the clutter return can be very large compared to the small return from the chest motion generated by respiration. The result is that a moving or breathing body cannot be distinguished from a stationary target of a living subject on the other side of an intervening wall.

Thus, a heretofore unaddressed need exists in the industry to address the aforementioned deficiencies and inadequacies.

SUMMARY

The present invention provides systems and methods for suppressing motion interference in a radar detection system. Briefly described, in architecture, one embodiment of the system, among others, can be implemented as follows. The system includes a signal generator that transmits microwave signals toward a target area. The system further includes a data control system to collect data from reflected microwave signals from the target area and to analyze the data in order to suppress unwanted motion interference generated by movement of the radar detection system.

The present invention can also be viewed as providing methods for suppressing motion interference in a radar detection system. One embodiment of the method, among others, can be summarized with the following steps. Microwave signals are transmitted toward a target area. Further, data is collected from reflected microwave signals from the target area, and unwanted motion interference generated by movement of the radar system is suppressed by analyzing the collected data.

Other systems, methods, features, and advantages of the present invention will be or become apparent to one with skill in the art upon examination of the following drawings and detailed description. It is intended that all such additional systems, methods, features, and advantages be included within this description, be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

When a radar detection device, such as the radar flashlight, is not stabilized by a wall, door, or tripod, motion, such as a user's hand motion, may be attributed to the wall and other non-moving objects illuminated by the radar. The result is that the moving or breathing body of the radar operator cannot be distinguished from a stationary human target on the other side of the intervening wall, for example. The radar system 100 of FIG. 1, however, utilizes the radar signature of a first non-moving object encountered (a wall, for example) to sense and isolate the motion associated with the radar detection device. After the associated motion is isolated, the motion can be suppressed from other objects that are encountered after the first non-moving object One embodiment, among others, of the radar system 100 shown in FIG. 1 includes a frequency-stepped operational mode. Note, a frequency-stepped radar is capable of capturing high range resolution radar data, which allows the radar signature of an intervening wall to be located with precision. If the location of the first non-moving object is known and if the range or phase change to the first non-moving object over time is known, then the motion artifacts that also affect and interfere with the desired target behind the non-moving object may be determined. Further, to avoid interference with other systems, the discrete step frequencies can be chosen to avoid mutual interference with other systems that may be operating in the same band of frequencies.

The step rate for a preferred embodiment is 2 MHz every 2 microseconds. Notice, however, the radar system of the present invention may also accommodate the operational modes of a frequency modulated continuous wave (FM-CW). Other embodiments of the radar system 100 also include other radar techniques and/or systems that experience problems regarding hand motion artifacts when the radar system is operated in a hand-held mode. For example, ultra-wide bandwidth (UWB) radar offers good range resolution and depending on system bandwidth, the resolution may be on the order of inches. The UWB radar, however, also has the same problem that the stepped frequency radar does with regard to hand motion artifacts.

Figure 1:
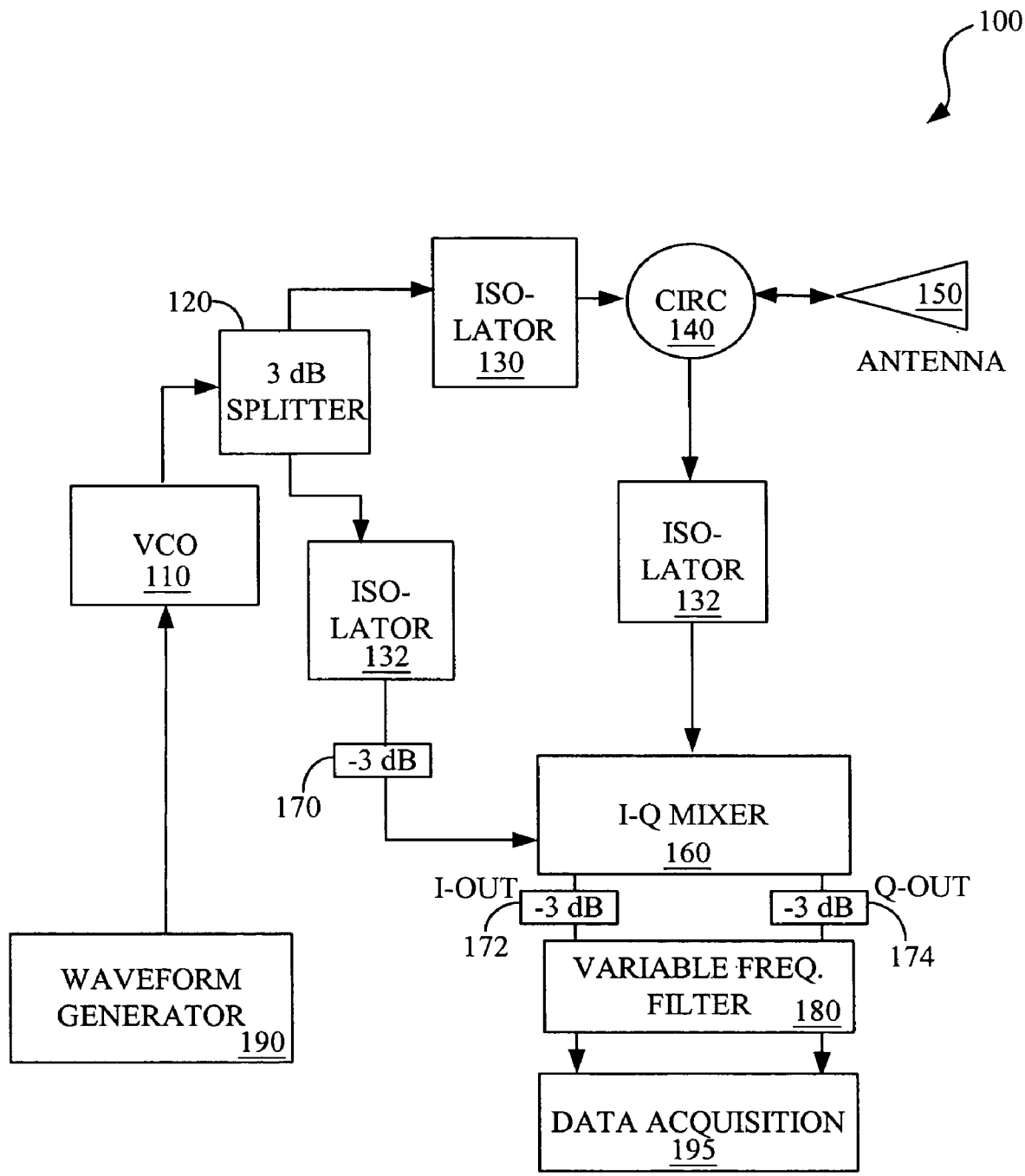
FIG. 1 is a block diagram of one embodiment of a radar system of the present invention for suppressing motion interference.

For the embodiment shown in FIG. 1, the components of the radar system 100 includes a TelGaAs source 110 that delivers +20 dBm (100 mW) of power, a power splitter 120, and isolators 130, 132, 134. The system 100 also includes a circulator 140, a horn antenna 150, a mixer module 160, three 3 dB attenuators 170, 172, 174, a variable filter 180, signal or waveform generator 190, and a data acquisition system 195, as shown. The waveform generator 190 generates the frequency modulation function for the source 110. Also, the source frequency can be changed between 10 and 12 GHz with a variable capacitor, commonly referred to as a varactor (not shown). Generally, the source can operate in swept or stepped mode for different embodiments. For interference avoidance, the source should be used in a stepped mode. Accordingly, in a preferred embodiment, the source is stepped between 10 and 11 GHz. Note, a single computer system may host both the data acquisition system 195 and waveform generator 190.

Physics dictates that a frequency-stepped radar should cover a broad segment within the RF spectrum in order to provide adequate range resolution to separate the radar return of a living subject standing near an opaque object, such as a wall, from the larger radar return from the wall. In the case of some embodiments 100, the radar may step over a frequency spectrum of 500 MHz to form the required high resolution range profile. While typically embodiments of the present disclosure operate on low power and should not cause interference, there may be unique situations where embodiments could cause radio frequency interference with another sensor in the immediate vicinity of the area where the current system is being used. To avoid one way or mutual interference, a mode of operation has been added to some embodiments to allow the radar system 100 to detect an active emitter in the vicinity of its operation and avoid that emitter's frequency of operation. The interference avoidance mode ensures that neither the radar system 100 or a close-by sensor will suffer any interference from the operation of the other.

When operated in the interference avoidance mode for some embodiments, the radar system 100 is stepped in frequency over the range of frequencies that will be used to search for a living subject behind an opaque object, such as a wall or door. The receiver output is monitored at each step. If a signal is detected at any one of the steps in frequency, the system controller determines the frequency step at which the interference was detected and stores that information in memory. Once the frequency scan or several scans for radio frequency interference is completed by the radar system 100 (in embodiments implementing the interference avoidance mode), a system controller (not shown) recalls from memory each of the frequency steps that experienced interference. The system controller sends the list of frequencies experiencing interference to a frequency step programmer (not shown). The frequency step programmer adds a frequency off-set to each of the frequency steps that is experiencing interference. The off-set may be above or below the programmed frequency step that is experiencing interference. Once a frequency off-set is applied to each of the frequency steps experiencing interference, a second frequency scan for interference is conducted using the same approach as the first scan. If interference is encountered on any of the frequency steps, then the off-set is again applied to those frequency steps in order to further reduce mutual interference between the radar system 100 and near-by sensors or other radio frequency devices. The off-set should be as small as required to avoid interference so as not to degrade the range resolution of the radar system 100. The smallest off-set possible from any pre-programmed frequency step is necessary because theoretically the frequency difference between each frequency step should be the same for the entire number of frequency steps. Large frequency off-sets will cause the range resolution to degrade.

Referring back to FIG. 1, a radio frequency generated by the source 110 is split into two components. A transmitter branch leads directly to the circulator 140 and to the antenna 150. A local oscillator (LO) branch provides the signal for the LO input to the mixer 160, as shown diagrammatically in FIG. 1. Echoes returned by a target are routed through the horn antenna 150 and circulator 140 to the RF input of the mixer 160. A low noise amplifier (LNA) typically is not needed, because the echoes are generally strong signals. In fact, an LNA with only 10 dB gain may amplify the reflected signal at the horn antenna 150 (−10 dBm) to a power level of 0 dBm.

When the frequency is stepped, the difference in the received phase caused by the energy reflected from a single target at a given range is detected in the mixer module and output as an in-phase (I) and as a quadrature (Q) signal. Together the I- and Q-signals represent a single beat frequency, which results in a sine (I component) and cosine (Q component) wave at the mixer output. Multiple targets at multiple ranges will generate multiple beat frequencies, which can be separated by means of a fast Fourier transform (FFT). The FFT generates a separate peak for every beat frequency and the display of the FFT data provides a range map when frequency is converted to range along the X-axis. Peaks further from the zero frequency line correspond to a greater range. Thus, the peaks output by the FFT are directly related to the range of the targets. If a target is moving, the signals will contain an additional Doppler frequency, which is small compared to the beat frequencies, but an essential component that should be recovered to distinguish between moving and non-moving target objects.

For the embodiment shown in FIG. 1, the data acquisition system 195 contains two analog-to-digital (A/D) converters (one for the in-phase (I) signal and one for the quadrature (Q) signal). The I and the Q signals are passed from the output of the radar mixer 160 to the input of an adjustable Krohn-Hite amplifier 172, 174 and filter 180. The amplifier 172, 174 adds gain to the stepped frequency radar so that the low amplitude beat note will provide a high amplitude signal to the following stage. The filter 180 is adjusted to ensure that all beat frequencies between 5 kHz and 100 kHz are passed. The filter 180 with this bandpass response ensures that the signal is not aliased and does not contain frequencies higher than the maximum sampling frequency of the analog-to-digital converter (A/D) in the digital acquisition system 195 which follows the amplifier filter stage 180. The A/D stage in the digital acquisition system 195 converts the filtered and amplified analog signal into a 12-bit parallel data word that can be processed by a computer, for example. The analog to digital conversion rate is slightly higher than 200 kHz, which meets the required Nyquist rate. The signals received by the data acquisition system 195 may be recorded at high speed onto hard disk for later analysis, while range profile data may also be processed and displayed in real time. Digital signal processing (DSP) high-speed chips preferably are employed to handle the real time processing requirements.

The data acquisition system 195 obtains high range resolution profile of objects in a target area. This allows the radar signature of an object to be located with precision. Therefore, for the situation where a desired target is positioned behind a wall or other obstacle, the radar signature of the wall may be determined along with the range to the wall over time. Therefore, motion artifacts that affect and interfere with the desired target behind the wall may be determined.

During operation, a radar detection device may be handheld with its antenna 150 directed at points of interest on an intervening wall in front of a target object. In doing so, hand jitter imparts motion to the radar, which is transferred to the reflecting objects, because only the relative motion between the radar and an object can be measured. The radar motion (hand jitter) manifests itself as a phase angle rotation that is the same for reflecting objects. Thus, motion of the radar detection device may become indistinguishable from the motion of a target object, such as a living entity.

Figure 2:
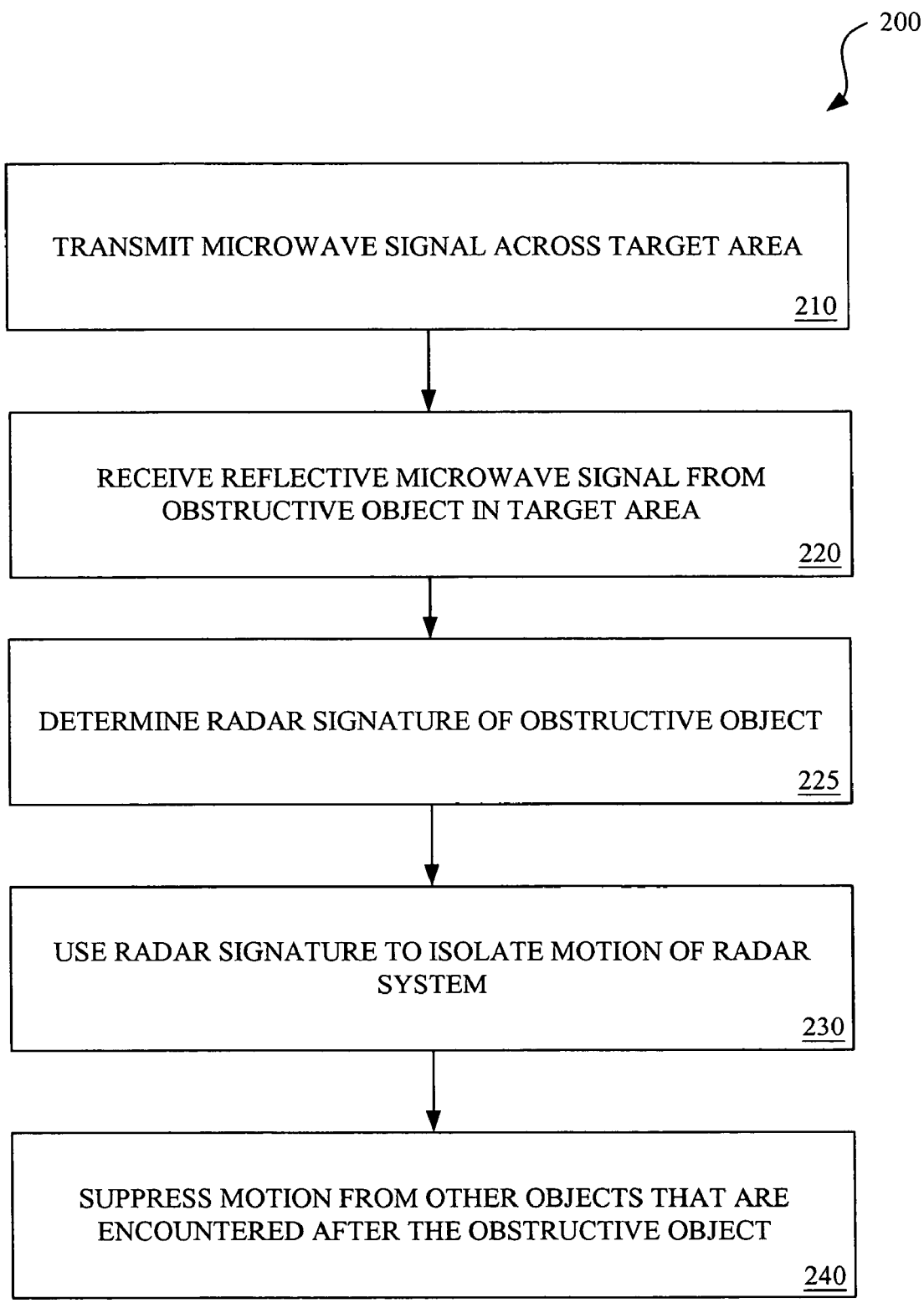
FIG. 2 is a flowchart describing the functionality of the radar system of FIG. 1.

Accordingly, as depicted in FIG. 2, the functionality of a representative embodiment of the radar system 100 or method 200 for compensating for movement in a radar system 100 may be construed as beginning at block 210. In block 210, a microwave signal is transmitted across a target area by a radar system 100. In block 220, reflective microwave signals from obstructive object(s) in the target area are received by the radar system 100. The radar signature of the first non-moving object encountered is used to sense and isolate the hand motion of the radar system 100, as shown in blocks 225-230. Then, in block 240, the motion, such as that caused by hand movement, is isolated and suppressed from other objects after the wall.

One method for suppressing hand motion involves computing the difference in phase angle between the first obstructive object, such as a wall, and any successive reflector. For example, let $\Phi w$ be the phase difference between the wall return and the local oscillator for a stationary radar and let $\Phi h$ be the phase differences between the human return and the local oscillator. A change in the radar's position will add a phase change $\Delta$ to both returns giving $\Phi w+\Delta$ and $\Phi h+\Delta$. Subtracting these phase values yields a resultant phase $\Phi r$ that is always referenced to the wall.

$$\Phi r=(\Phi h+\Delta)-(\Phi w+\Delta)=\Phi h-\chi \qquad \text{Equation 1}$$

Note, $\Phi h$ changes with time (from one FFT to another) while $\Phi w$ is fixed. Accordingly, the rotation rate of $\Phi r$ and $\Phi h$ are identical. $\Phi r$, however, is separated from $\Phi h$ by a fixed phase angle, which does not affect the rotation rate of the vectors.

For one embodiment, the phase corrective technique that cancels or suppresses hand motion is implemented by rotating the vector associated with the first wall and the first range profile in a clockwise sense to zero. Let that phase change be $\Phi z$. That same phase change ($\Phi z$) is also applied to every range cell after the first wall in the same clockwise direction. A similar operation is performed on all successive range profiles, so that all wall vectors have a phase of zero. The net effect of this algorithm is that the first wall and all fixed objects after the first wall were made to be stationary relative to the radar, which is equivalent to having the radar on a tripod. Thus, complete cancellation of the hand motion can be achieved with this phase corrective technique. Therefore, collected data should be processed to differentiate between moving and non-moving entities and to determine their location in range from the wall. Accordingly, one implementation of this collection process is shown in FIG. 3.

Figure 4:
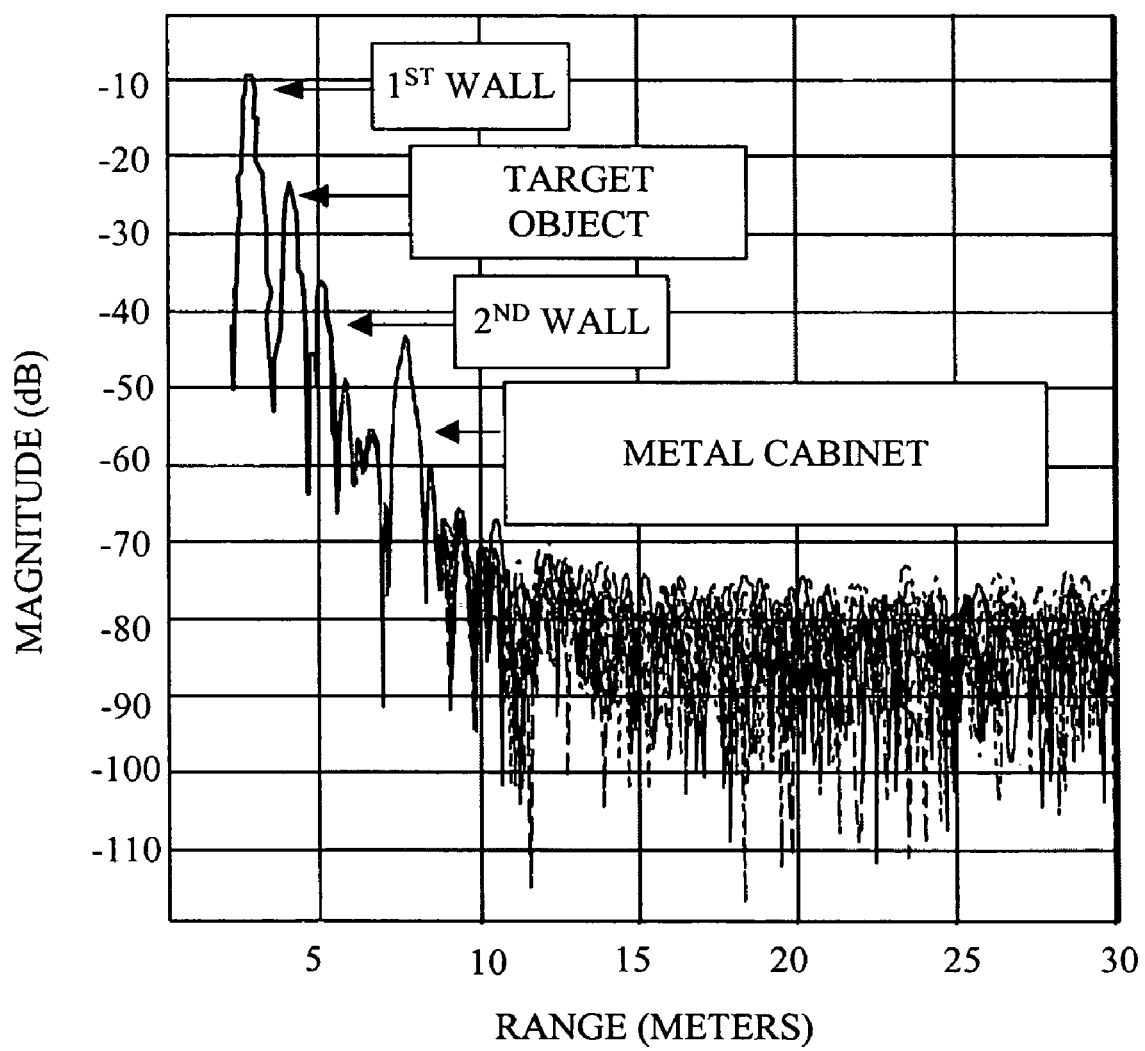
FIG. 4 is a graph of a range profile generated by fast Fourier transform operations utilized in the process of FIG. 3.

The collection process 300 is initiated by collecting 512 I, Q data points while the frequency is stepped or swept from 10 to 11 GHz, as shown in block 310. Then for each frequency step, in block 320, the respective 512 points are expanded to a respective 2048 point vector by adding 1,536 I, Q pairs that contain only zeros and are processed with the fast Fourier transform (FFT), as shown in block 330. The purpose of the data expansion 320 is to increase the number of points in the FFT to facilitate easy recognition of the peaks in the FFT. A typical range FFT, also referred to as a horizontal FFT, is shown in FIG. 4.

Figure 3:
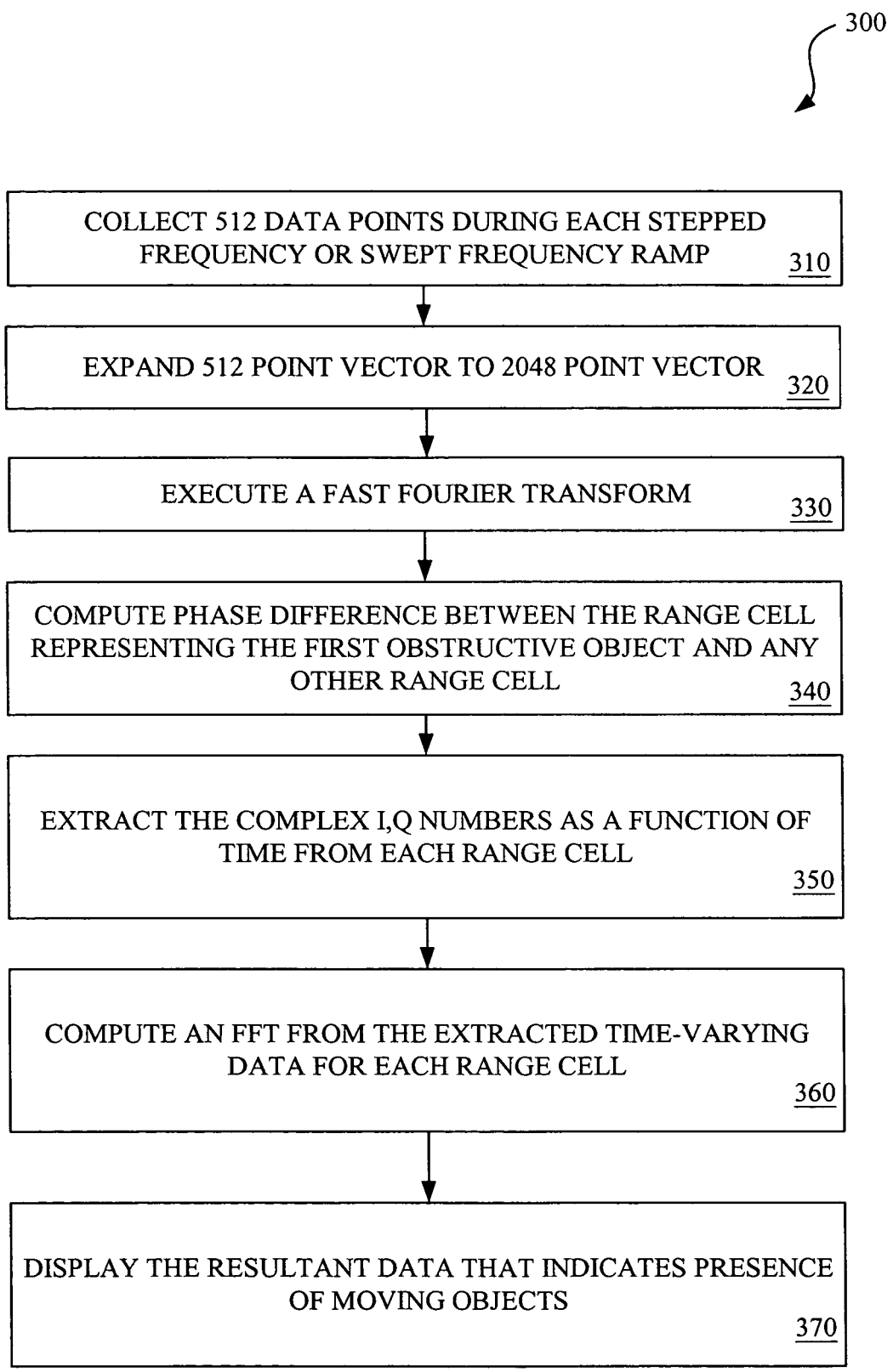
FIG. 3 is a flowchart describing one implementation for suppressing motion interference in FIG. 2 by computing phase differences.

In block 340 of FIG. 3, the phase difference between the range cell representing the first wall and any other range cell is computed. Note, the output generated from block 340 may be viewed as a matrix of radar range cells in the horizontal dimension and time-varying range cells in the vertical dimension. The columns of time-varying range cells may be transformed with a FFT (vertical FFT) to determine the Doppler frequencies of a particular object located at that range. Accordingly, in block 350, the complex I, Q numbers from the each range cell are extracted as a function of time. Then, in block 360, a vertical FFT is computed from this extracted time-varying data for each range cell. According to block 370, the resultant data may be displayed in a three-dimensional format (as shown in FIGS. 6-10) showing range (in feet) along the X-axis, Doppler (in Hertz) along the Y-axis and intensity (in dBm) along the Z-axis. With the motion of the radar system accounted for, the three-dimensional graph indicates the presence of moving objects.

Figure 5:
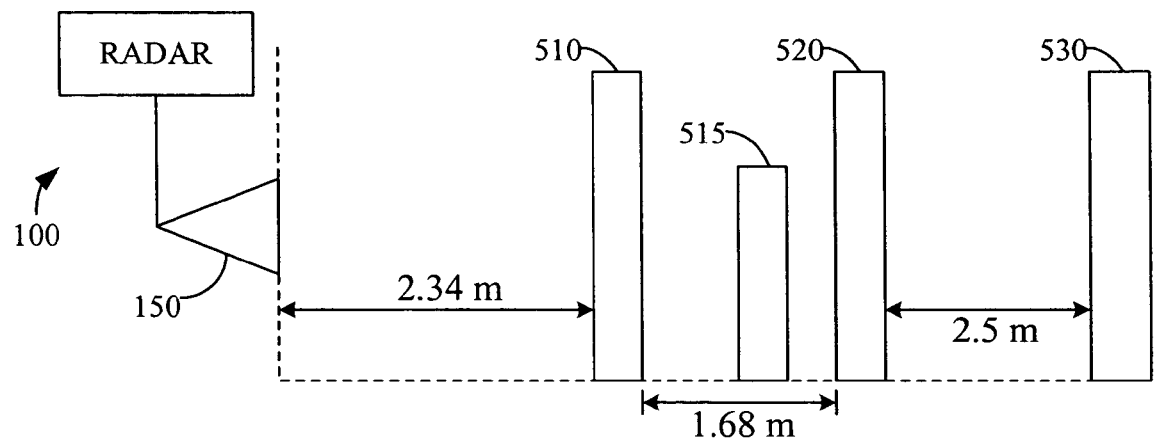
FIG. 5 is a block diagram of the physical configuration of reflection objects that produced the range profile of FIG. 4.

To demonstrate the functionality of the radar system 100, consider the physical configuration of reflecting objects shown in FIG. 5. As depicted, a first wall 510 is located 2.34 meters from the antenna 150 of the radar system 100. A second wall 520 is located 1.68 meters from the first wall 510 and a metal cabinet 530 is located 2.5 meters from the second wall 520. Between the first and second walls, a target object 515, for example, a breathing human subject, is also located. Consider that the location of the physical objects 510-530 that provide the reflections for the peaks in the range profile of FIG. 4 are shown in the range diagram in FIG. 5. For the range profile of FIG. 5, a tripod mounted radar corner reflector was first used as the target object 515 to identify the various peaks in the range profile by changing its location in range while watching the radar.

Figure 6:
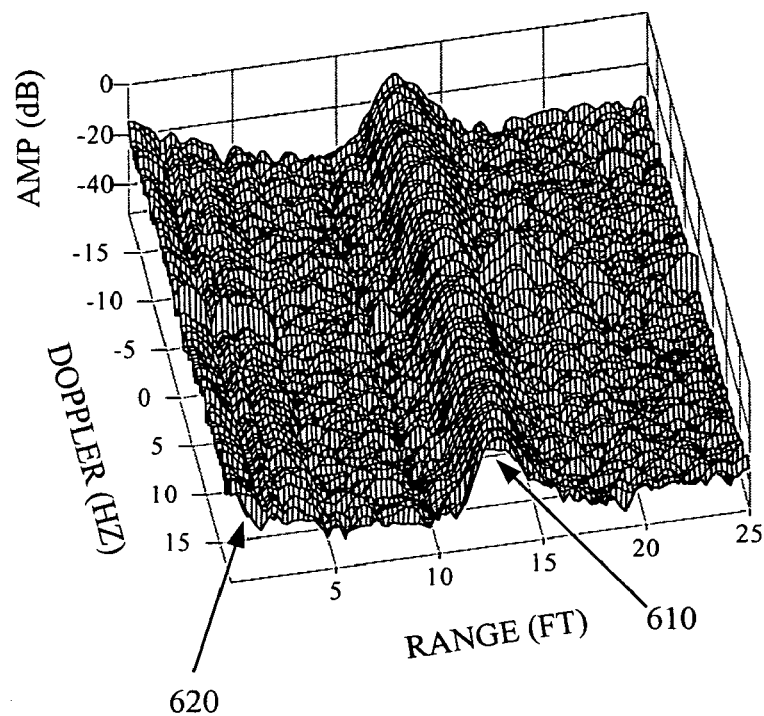
FIG. 6 is a Doppler-range profile for the reflection objects in FIG. 5 for a stationary radar detection system and a moving human test subject present as one of the reflection objects.

FIG. 6 shows a radar range-Doppler display of a moving person with a stationary radar system 100. Here, the corner reflector was replaced with a human test subject as the target object 515, and the radar 100 was placed on a tripod to eliminate hand jitter. The test subject was asked to take a position in the center of the hallway within the radar beam, and to first move the distance of one step forward and then one step backwards. During the process of moving forward, the subject accelerated the body forward and then decreased the body speed by coming to a stop. This sequence was repeated when the subject reversed motion in the opposite direction by taking a step backwards. This type of motion generates positive and negative Doppler frequencies that cover the full spectrum of the vertical FFT. The human induced Doppler frequencies occur only within the range bins where the person is located. As a result, a 3-dimensional graph of all Doppler frequencies at each range bin shows an elongated peak, which is the unique signature for this type of motion. This elongated peak, indicated by pointer 610, is clearly visible in FIG. 6 and extends from −20 to +15 Hertz in the Doppler domain in FIG. 6.

The reflection from the radar antenna 150 is also observable in FIG. 6, as indicated by pointer 620. This is due to a mismatch in the antenna 150 that causes a large amount of power to return to the radar. As shown, reflections from the first or second wall and metal cabinet do not appear to be very prominent in the graph. This is because the FFT of data from a non-moving object maps to zero Doppler (phase change) on the graph.

Figure 7:
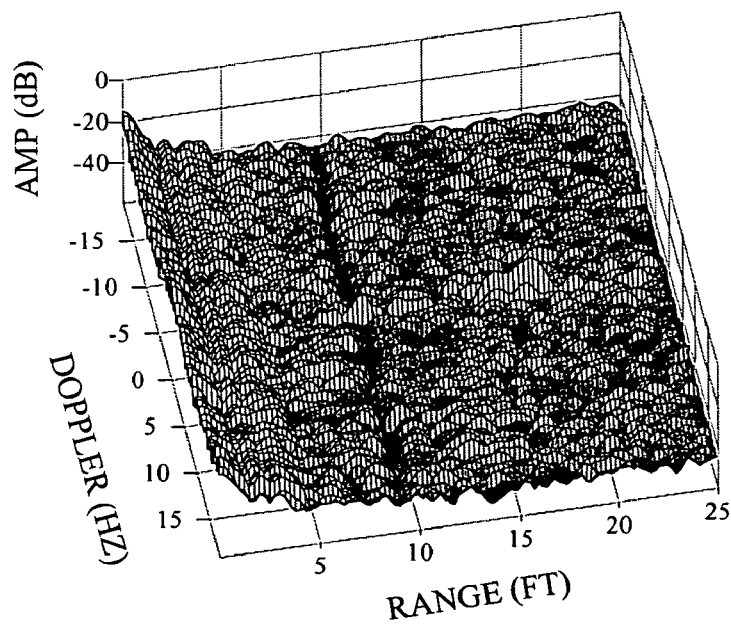
FIG. 7 is a Doppler-range profile for the reflection objects in FIG. 5 for a stationary radar detection system and a non-human test subject present as one of the reflection objects.
Figure 8:
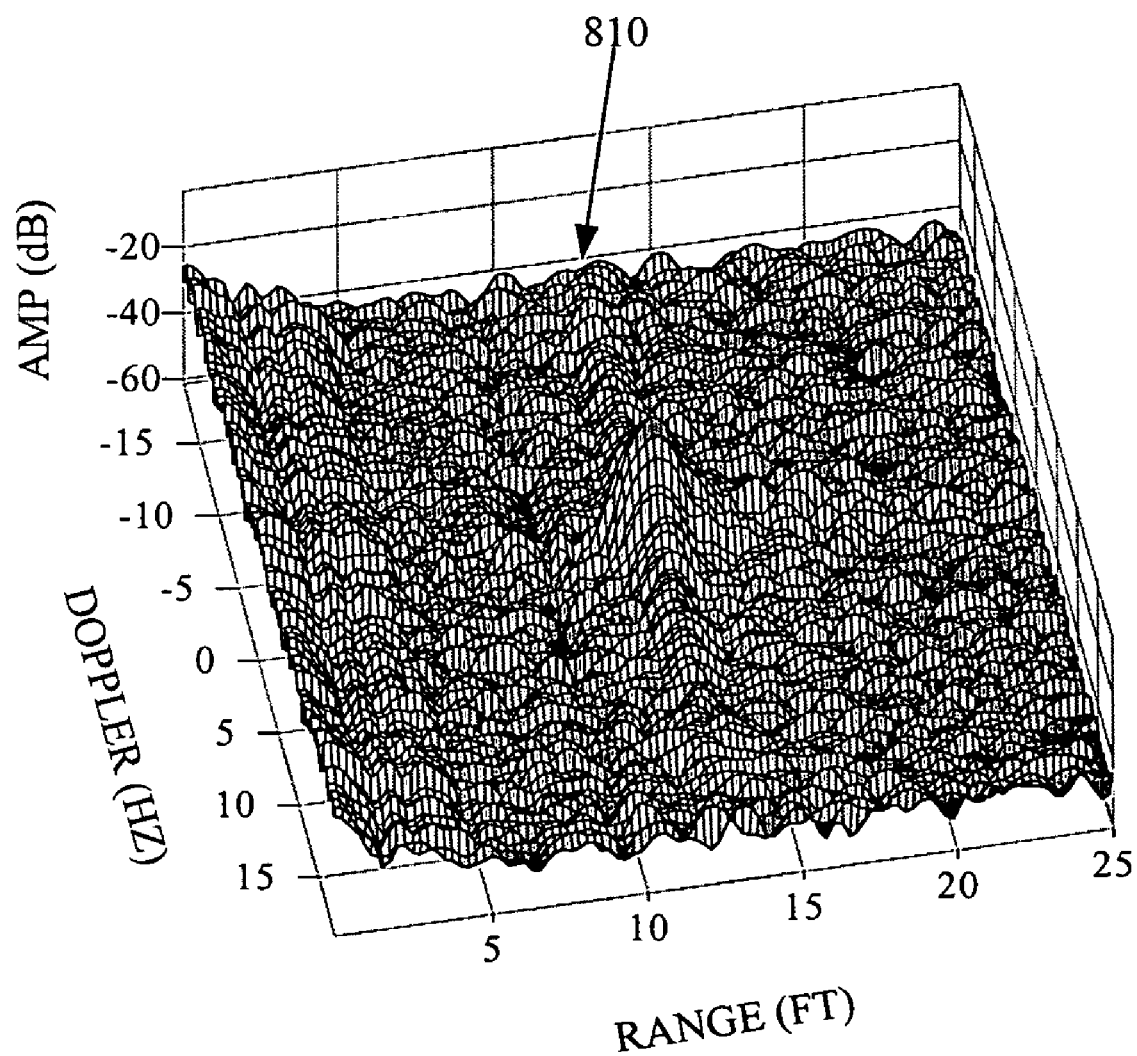
FIG. 8 is a Doppler-range profile for the reflection objects in FIG. 5 for a stationary radar detection system and a stationary-breathing human test subject present as one of the reflection objects.

Notice in FIG. 6, the step forward and back motion of the test subject creates a different spectrum than a walking subject would. A subject walking only along one particular direction would not display an elongated peak, but a narrow band of high frequencies only in the positive or only in the negative region of the FFT. The resulting 3-dimensional display would then show a narrow peak that would typically cover a few high Doppler frequencies and a few range bins. In either case, a moving person may be easily detected by high amplitudes at high Doppler frequencies relative to the surrounding background. The detection mechanism for the peak could be a simple constant false alarm (CFAR) algorithm that searches a 3-dimensional map similar to that shown in FIG. 6. For comparison purposes, FIG. 7 shows a 3-dimensional map when no moving human is present in the physical configuration of FIG. 5. Thus, no peak in a non-zero Doppler region is evident in the graph. Next for FIG. 8, the test subject 515 stood still and breathed at a 2-second interval. Again, the radar system 100 remained stationary on the tripod. As shown and indicated by pointer 810, the breathing test subject 515 is detected, even though the chest wall of the subject is moving only a fraction of a wavelength during breathing. Thus, the Doppler frequencies of the breathing subject is small and close to the zero-frequency (DC) line, as compared to the moving test subject in FIG. 6 (as referenced by pointer 610) that exhibited a larger Doppler frequency spread.

Figure 9:
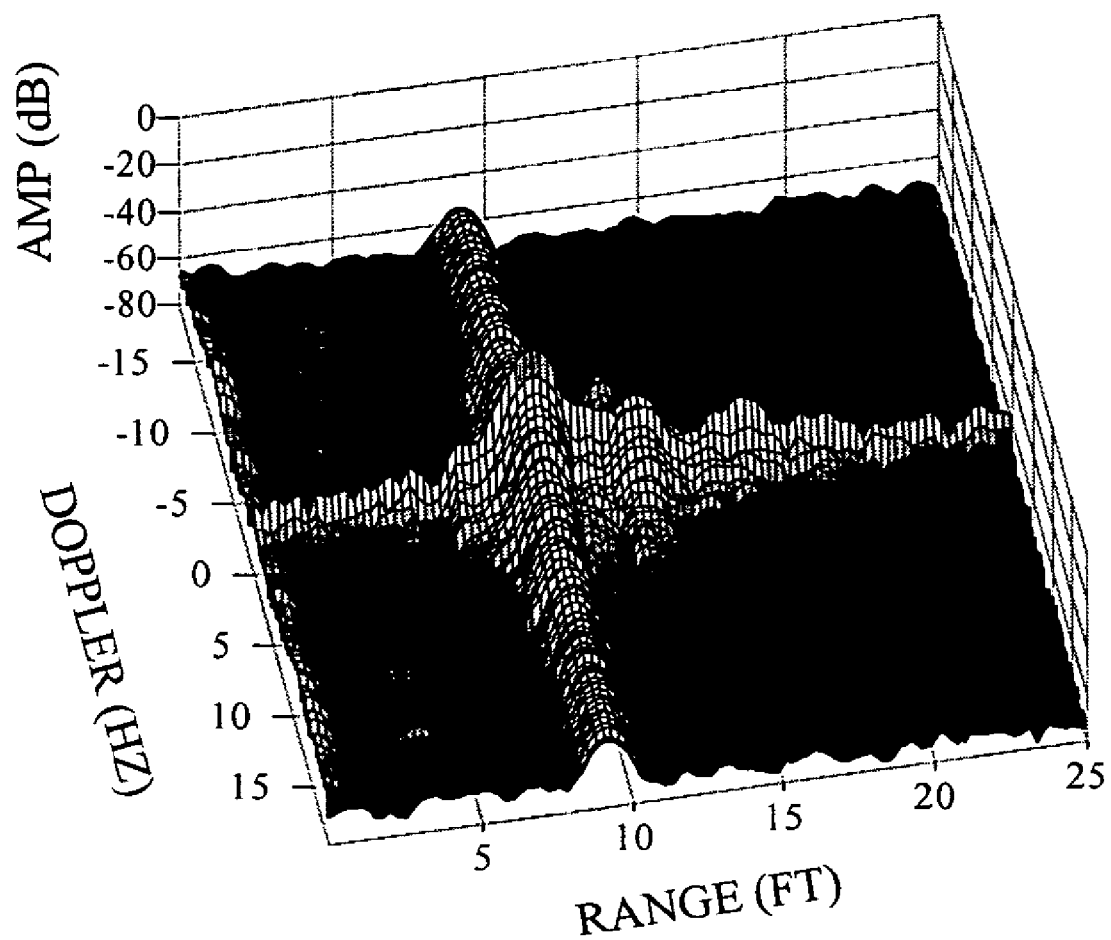
FIG. 9 is a Doppler-range profile for the reflection objects in FIG. 5 for a moving radar detection system and a stationary-breathing human target object present as one of the reflection objects.

As mentioned previously, the detection of a breathing person is more difficult if a radar detection device is held in a hand. Without an effort to correct for hand jitter, the 3-dimensional graph in FIG. 9 shows that a peak could be confused for a moving person, but, in reality, this peak, in this example case, is the first wall 510 located approximately nine feet from the radar 100. The Doppler of the first wall 510 consists of frequency components due to hand jitter. Also, the antenna return in the 3-dimensional graph in FIG. 9 has been eliminated.

Consider, when the target object 515 is a breathing person, phase corrections will be necessary, but may not immediately improve detection of the stationary-breathing person (whose chest is a moving object). For example in FIG. 10, phase corrections were applied to the data generated when the subject was breathing at 2 second intervals. The 3-dimensional graph, however, does not appear to indicate a significant improvement in the detection of the breathing test subject 515. The reason for this problem is that a breathing subject's Doppler frequencies are close to the zero Doppler line. Therefore, for a breathing person, detection may be enhanced by applying a detection algorithm that takes the difference in Doppler spread between a non-moving and a moving object, such as the chest of a breathing person, into account.

Note, the Doppler spectra produced by a breathing person and non-moving objects, such as the first 510 and second wall 520, are distinctly different. For example, if the Doppler spectra in FIG. 10 were viewed from above, one would notice that the first wall has sidelobe features that are clearly different from the Doppler spread of the breathing person. For the second wall 520, these features are also evident, but not visible in the graph, because the reflection is much smaller compared to that of the first wall 510. Correspondingly, by taking into account the characteristics of the spectra produced by a breathing person, a detection algorithm may be formulated to distinguish the Doppler spreads of a breathing subject (whose chest is a moving object) and non-moving objects. One embodiment for implementing a detection algorithm is shown in FIG. 11.

Figure 11:
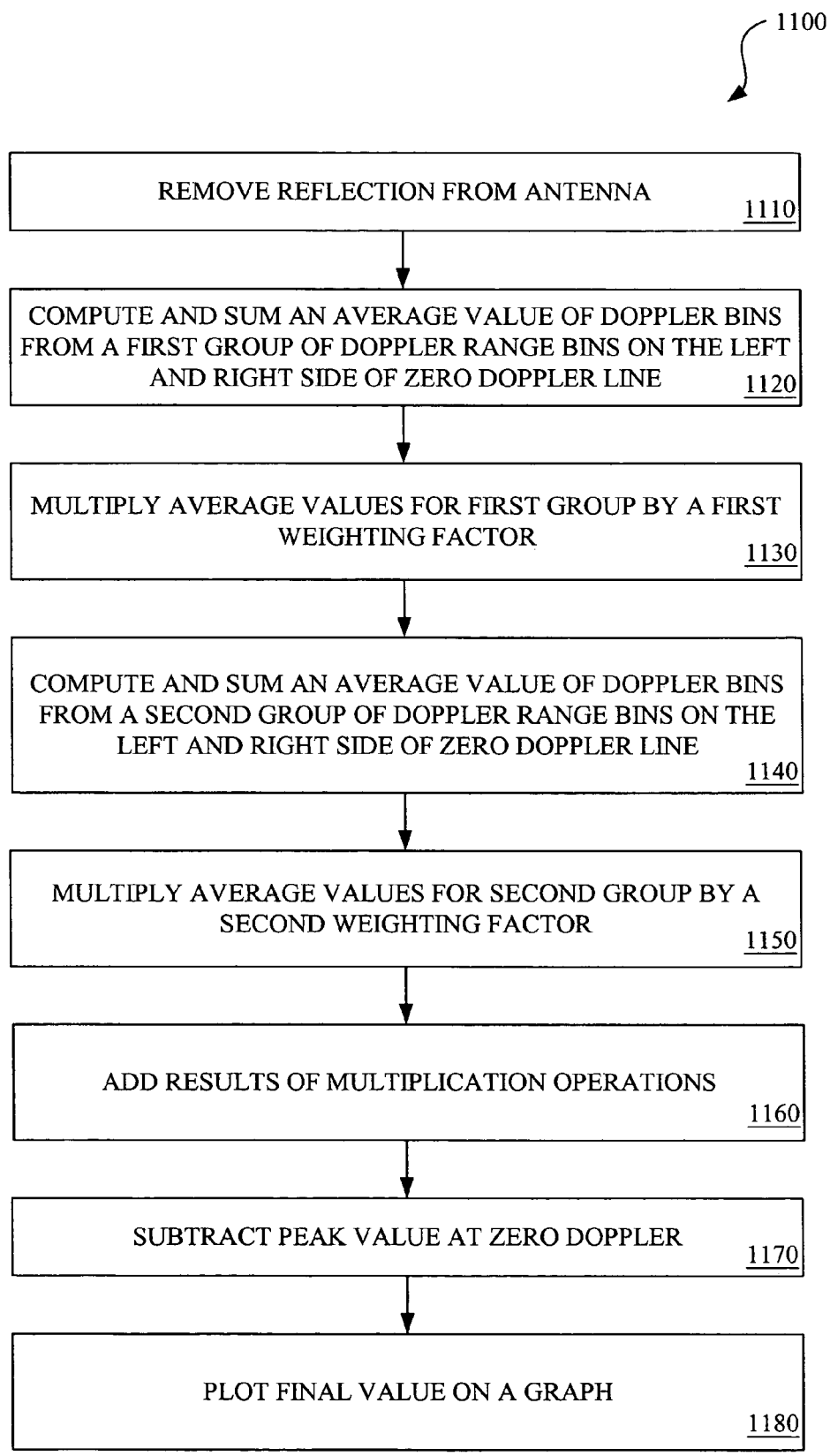
FIG. 11 is a flowchart describing a process for enhancing detection of a stationary-breathing human test subject by a moving radar detection system in FIGS. 9-10.

First, in FIG. 11, the antenna reflection is removed, as shown in block 1110. Then, for all range bins after the antenna reflection, the average value of Doppler bins 11 through 20 on the left and right side of the zero Doppler line are computed and summed as shown in block 1120. These average values are referred to as number two sidelobes left ($SL_{2L}$) and number two sidelobes right ($SL_{2R}$). $SL_{2L}$ and $SL_{2R}$ are summed and multiplied by the weighing factor $W_2$ as shown in block 1130. Next, for all range bins after the antenna reflection the average value of Doppler bins 1 through 10 on the left and right side are computed. These values are referred to as number one sidelobes left ($SL_{1L}$) and number one sidelobes right ($SL_{1R}$). $SL_{1L}$ and $SL_{1R}$ are summed and multiplied in block 1150 by the weighing factor ($W_1$). Then, in block 1160, the results of the multiplication operations in blocks 1130 and 1150 are added together, and the peak value at zero Doppler ($P_0$) is subtracted from the value obtained in block 1160, as shown in block 1170. This final value ($V_F$), given as $V_F=[W_1(SL_{1L}+SL_{1R})+W_2(SL_{2L}+SL_{2R})]-P_0$, may be plotted on a graph, as shown in block 1180.

Figure 10:
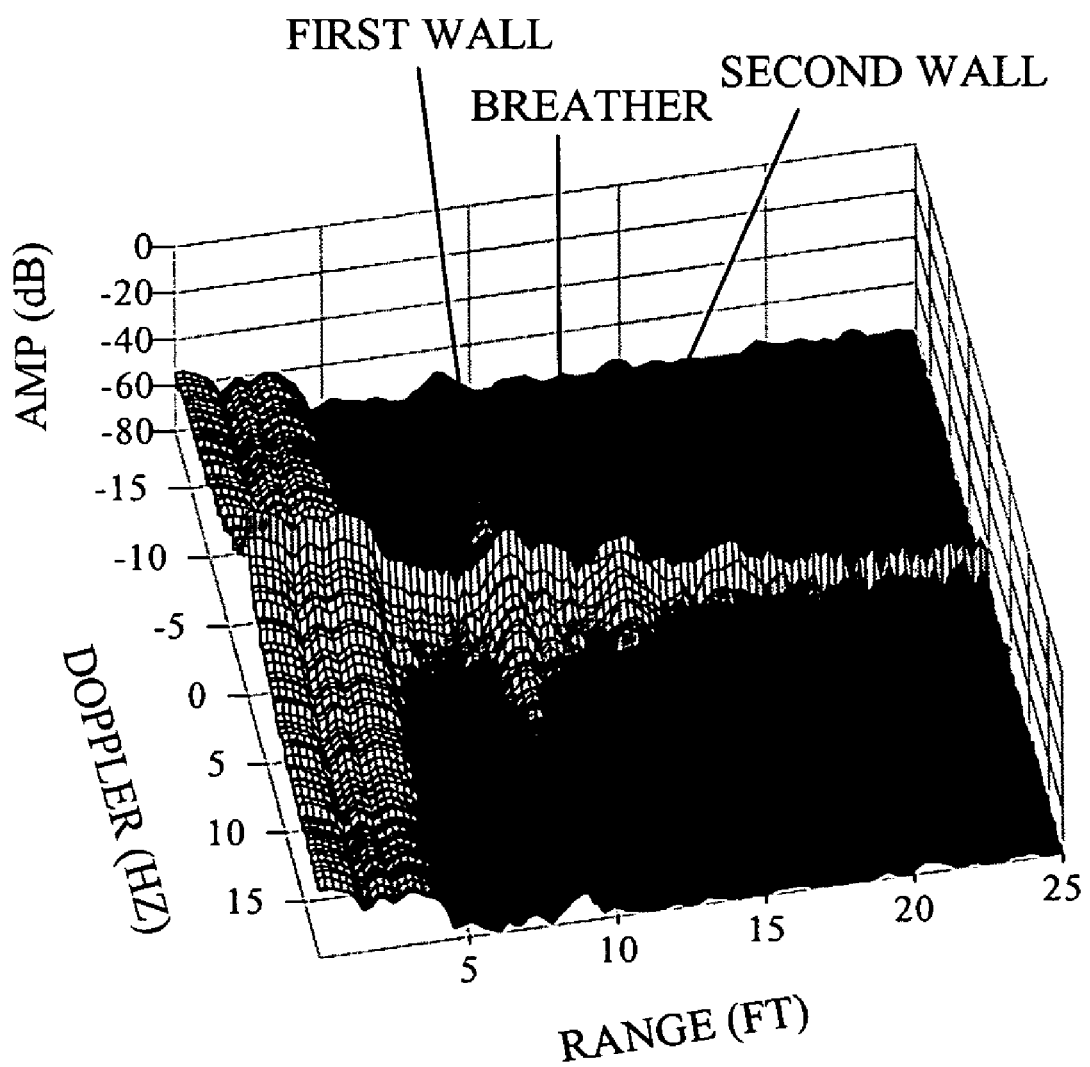
FIG. 10 is a Doppler-range profile for the reflection objects in FIG. 5 for a moving radar detection system and a stationary-breathing human test subject present as one of the reflection objects with phase corrections applied.
Figure 12:
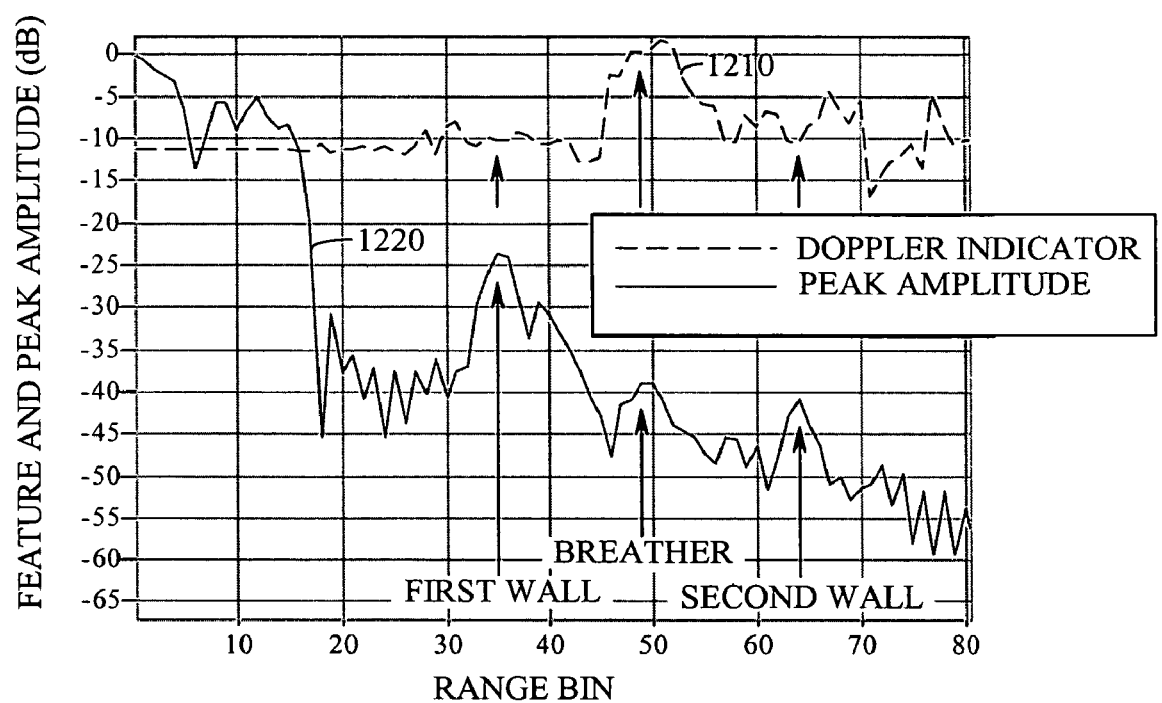
FIG. 12 is a Doppler-range profile for the reflection objects in FIG. 5 for a moving radar detection system and a stationary-breathing human target object after the process of FIG. 11 has been applied.

A plot of the detection result for a first weighting factor ($W_1$) of ⅛ and a second weighting factor ($W_2$) of ⅜ is shown in FIG. 12 for the data of FIG. 10. The dashed line 1210 is the detection algorithm 1100 output. The solid line 1220 is a radar range profile to illustrate the correlation between the detection peaks and the radar peaks of the moving and non-moving objects. As shown, the breathing subject 515 at range bin 49 exceeds all other peaks by at least 6 decibels (dB) or more. Note, the first wall reflection was removed by the detection algorithm 1100. The small peaks after the breathing subject 515 are due to noise fluctuations, which may be attenuated by the application of a constant false alarm rate (CFAR) algorithm prior to the detection. The application of a CFAR algorithm is contemplated in other embodiments of the invention.

To be effective and to obtain an output for the display, the detection algorithm 1100 may also be subjected to a threshold. Accordingly, any detection value that exceeds the threshold would identify a stationary-breathing person. For example, in FIG. 12, the threshold could have been set to −5 dB. In practice, the threshold may be determined after enough data has been collected to maximize detections, but at the same time also reduce the false alarm rate to a low specified value.

The data acquisition and signal processing components of embodiments of the present invention can be implemented in hardware, software, firmware, or a combination thereof. In some preferred embodiment(s), the data acquisition and signal processing components are implemented in hardware. Accordingly, the data acquisition and signal processing components can be implemented with any or a combination of the following technologies, which are all well known in the art: a discrete logic circuit(s) having logic gates for implementing logic functions upon data signals, an application specific integrated circuit (ASIC) having appropriate combinatorial logic gates, a programmable gate array(s) (PGA), a field programmable gate array (FPGA), etc. In some alternative embodiments, the data acquisition and signal processing components may also be implemented in software or firmware that is stored in a memory and that is executed by a suitable instruction execution system.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, as previously mentioned, one embodiment, among others, includes a radar system 100 that isolates motion associated with a radar detection device utilizing UWB technology.

All such modifications and variations are intended to be included herein within the scope of this disclosure and the present invention and protected by the following claims.

Therefore, having thus described the invention, at least the following is claimed:

1. A radar detection system for suppressing motion interference, comprising:
   a signal generator to transmit microwave signals toward a target area, wherein the signal generator operates in one of a step frequency mode and a sweep frequency mode; and
   a data control system configured to collect data from reflected microwave signals received by the radar detection system from at least a moving object and an intervening structure between the radar detection system and the moving object in the target area and to analyze the data and suppress, in the signals, unwanted motion interference generated by movement of the radar detection system,
   wherein the data control system is further configured to identify the presence of the moving object in the target area from the signals received by the radar detection system from the target area.

2. The system of claim 1, wherein the signal generator increases the frequency of the microwave signals in discrete fixed steps.

3. The system of claim 2, wherein the signal generator increases the frequency of the microwave signals in discrete fixed steps that avoid interference with a radar emitter operating in the vicinity.

4. The system of claim 1, wherein the signal generator operates in a sweep frequency mode.

5. The system of claim 1, wherein the moving object includes a chest of a stationary person that is breathing.

6. The system of claim 1, wherein the data control system is further configured to identify the location of the moving object in the target area.

7. The system of claim 6, further comprising:
   a display device to visually show the location of the moving object.

8. The system of claim 7, wherein the location of the moving object is shown relative to non-moving objects in the target area.

9. The system of claim 7, wherein the display device further shows a scale of distance that the moving object is from the radar detection system.

10. The system of claim 1, wherein the data control system is further configured to remove unwanted reflections produced by an antenna of the radar system.

11. The system of claim 1, wherein the data control system is configured to suppress the unwanted motion interference by:
    analyzing signals received by the radar detection system;
    determining the phase of a signal reflected from the closest non-moving obstructing object which characterizes the interference generated by motion of the radar system; and
    compensating for the interference generated by motion of the radar system in a signal reflected from a target object.

12. The system of claim 11, wherein the data control system is further configured to:
    identify that the target object is a moving object.

13. The system of claim 12, wherein the moving object comprises a chest of a stationary subject that is breathing.

14. The system of claim 13, wherein the data control system is further configured to:
    indicate to an operator that the moving object is the chest of the stationary subject.

15. The system of claim 13, wherein the data control system is further configured to:
    enhance identification of a stationary subject that is breathing by emphasizing the difference in the data obtained for an obstructing non-moving object and the data obtained from the chest of a stationary subject that is breathing.

16. The system of claim 1, wherein the intervening structure comprises a non-conductive wall.

17. A radar detection system for suppressing motion interference, comprising:
    means for transmitting microwave signals, wherein microwave signals are transmitted in one of a step frequency mode and a sweep frequency mode;

means for collecting data from reflected microwave signals received by the radar detection system from at least a moving object and an intervening structure between the radar detection system and the moving object in the target area;

means for suppressing, in the signals, unwanted motion interference generated by movement of the radar detection system; and means for identifying the presence of the moving object from the signals received by the radar detection system.

18. The system of claim 17, wherein the frequencies of the microwave signals are increased in discrete fixed steps.

19. The system of claim 17, wherein the frequencies of the microwave signals are increased in discrete fixed steps in a manner that avoids interference with a radar emitter operating in the vicinity.

20. The system of claim 17, where the frequencies are increased in a sweep mode.

21. The system of claim 17, wherein the moving object includes a chest of a stationary subject that is breathing.

22. The system of claim 17, further comprising:
means for identifying the location of the moving object.

23. The system of claim 22, further comprising:
means for visually showing the location of the moving object.

24. The system of claim 23, wherein the location of the moving object is shown relative to non-moving objects.

25. The system of claim 23, wherein the location of the moving object is shown as a range between the radar detection system and the moving object.

26. The system of claim 17, further comprising:
means for removing unwanted reflections produced by an antenna of the radar system.

27. The system of claim 17, further comprising:
means for determining the phase of a signal reflected from the closest non-moving obstructing object which characterizes the interference generated by motion of the radar system; and
means for compensating for the interference generated by motion of the radar system in a signal reflected from a target object.

28. The system of claim 27, further comprising:
means for identifying that the target object is a moving object.

29. The system of claim 28, wherein the moving object comprises a chest of a stationary subject that is breathing.

30. The system of claim 29 further comprising:
means for indicating to an operator that the moving object is the chest of the stationary subject that is breathing.

31. The system of claim 29 further comprising:
means for enhancing identification of a stationary subject that is breathing by emphasizing the difference in the data obtained from a non-moving obstructing object and from a chest of a stationary subject that is breathing.

32. The system of claim 17, wherein the intervening structure comprises a non-conductive wall.

33. A method for suppressing motion interference in a radar detection system, comprising the steps of:

transmitting microwave signals toward a target area, wherein microwave signals are transmitted in one of a step frequency mode and a sweep frequency mode;

collecting data from reflected microwave signals received from the target area from at least a moving object and an intervening structure between the radar detection system and the moving object in the target area;

suppressing, in the signals, unwanted motion interference generated by movement of the radar detection system by analyzing the data; and identifying the presence of the moving object in the target area from the signals received from the target area.

34. The method of claim 33, the suppressing step further comprising the steps of:
applying a phase corrective technique to cancel the unwanted motion interference.

35. The method of claim 33, wherein the frequencies of the microwave signals are increased in discrete fixed steps.

36. The method of claim 33, wherein the frequencies of the microwave signals are increased in discrete fixed steps in a manner that avoids interference with a radar emitter operating in the vicinity.

37. The method of claim 33, wherein the frequencies are increased in a sweep mode.

38. The method of claim 33, wherein the moving object comprises a chest of a stationary subject that is breathing.

39. The method of claim 33, further comprising the step of:
identifying the location of the moving object in the target area.

40. The method of claim 39, further comprising the step of:
visually showing the location of the moving object in the target area.

41. The method of claim 40, wherein the location of the moving object is shown relative to non-moving objects in the target area.

42. The method of claim 40, wherein the location of the moving object is shown as a range between the radar detection system and the moving object.

43. The method of claim 33, the suppressing step further comprising the steps of:
determining the phase of a signal reflected from the closest non-moving object which characterizes the interference generated by motion of the radar system; and
compensating for the interference generated by motion of the radar system in a signal reflected from a target object.

44. The method of claim 43, further comprising the step of:
identifying that the target object is a moving object.

45. The method of claim 44, wherein the moving object includes a chest of a stationary subject that is breathing.

46. The method of claim 45, further comprising the step of:
indicating to an operator that the moving object is the chest of the stationary subject that is breathing.

47. The method of claim 45, further comprising the step of:
enhancing identification of a stationary subject that is breathing by emphasizing the difference in the data obtained for an obstructing non-moving object and a chest of a stationary subject that is breathing.

48. The method of claim 33, wherein the intervening structure comprises a non-conductive wall.

* * * * *